US012757111B2

(12) United States Patent
Solaija et al.

(10) Patent No.: US 12,757,111 B2
(45) Date of Patent: Oct. 6, 2026

(54) COORDINATION GROUP FORMATION AND SCHEME SELECTION IN THE PRESENCE OF MULTI-LINK DEVICES

(71) Applicant: Vestel Elektronik Sanayi ve Ticaret A. S., Manisa (TR)

(72) Inventors: Muhammad Sohaib Jamal Solaija, Istanbul (TR); Hanadi Mohammed Yousef Salman, Istanbul (TR); Hüseyin Arslan, Istanbul (TR)

(73) Assignee: Vestel Elektronik Sanayi ve Ticaret A. S., Manisa (TR)

( * ) Notice: Subject to any disclaimer, the term of this patent is extended or adjusted under 35 U.S.C. 154(b) by 627 days.

(21) Appl. No.: 18/249,765

(22) PCT Filed: Oct. 19, 2021

(86) PCT No.: PCT/EP2021/078928

§ 371 (c)(1),
(2) Date: Apr. 20, 2023

(87) PCT Pub. No.: WO2022/084304

PCT Pub. Date: Apr. 28, 2022

(65) Prior Publication Data

US 2023/0388920 A1 Nov. 30, 2023

(30) Foreign Application Priority Data

Oct. 21, 2020 (EP) .................................... 20203137

(51) Int. Cl.
*H04W 48/20* (2009.01)
*H04W 40/12* (2009.01)

(52) U.S. Cl.
CPC ........... *H04W 48/20* (2013.01); *H04W 40/12* (2013.01)

(58) Field of Classification Search
CPC . H04W 48/20; H04W 40/12; H04W 28/0236; H04W 92/20; H04W 24/02;
(Continued)

(56) References Cited

U.S. PATENT DOCUMENTS

2012/0282934 A1* 11/2012 Simonsson ........... H04W 72/12 455/446
2013/0294288 A1* 11/2013 Choi ..................... H04L 47/745 370/254

(Continued)

FOREIGN PATENT DOCUMENTS

EP 2538603 A1 * 12/2012 ........... H04L 5/0035
JP 2009231983 A2 8/2009

OTHER PUBLICATIONS

Li, "Consideration-on-Multi-AP Coordination", IEEE Mentor, 2019, pp. 1-11.

(Continued)

*Primary Examiner* — Jeffrey M Rutkowski
(74) *Attorney, Agent, or Firm* — The Webb Law Firm

(57) ABSTRACT

Provided is a control apparatus and a control method for a wireless communication system. The control apparatus is configured to determine for candidate group(s) of access points whether backhaul link feature(s) meet a requirement for coordinated communication with a terminal device. The requirement for coordinated communication includes a requirement for multi-link operation and/or a requirement for a coordination scheme. Based on a result of this determination, a candidate group of access points is selected as a group of APs for serving the terminal device in coordinated communication. By disclosing these techniques, the present disclosure provides for considering multi-link operation and/or coordination scheme selection in coordinated communication.

13 Claims, 9 Drawing Sheets

(58) Field of Classification Search
CPC ..... Y02D 30/70; H04L 5/0091; H04L 5/0023; H04L 5/001; H04L 5/0035; H04B 7/024
See application file for complete search history.

(56) References Cited

U.S. PATENT DOCUMENTS

| | | | |
|---|---|---|---|
| 2016/0105903 | A1 | 4/2016 | Hessler et al. |
| 2018/0027455 | A1 | 1/2018 | Lei et al. |

OTHER PUBLICATIONS

Parekh et al., "Considerations for Inter-AP Coordination Establishment", IEEE mentor, 2019, pp. 1-16.
Hirata et al. (Sony Corporation), "Discussion on Multi-band operation", IEEE 802.11-19/0818r0, Jul. 2019.
LAN/MAN Standards Committee of the IEEE Computer Society, Amendment 8: Enhancements for extremely high throughput (EHT), IEEE P802.11be™/D0.1, Sep. 2020, section 3.2.
3rd Generation Partnership Project (3GPP), System architecture for the 5G System (5GS); Stage 2 (Rel-16), Technical Specification 23.501, version 16.5.1, Aug. 2020.

* cited by examiner

COORDINATION GROUP FORMATION AND SCHEME SELECTION IN THE PRESENCE OF MULTI-LINK DEVICES

CROSS-REFERENCE TO RELATED APPLICATIONS

This application is the United States national phase of International Application No. PCT/EP2021/078928, filed Oct. 19, 2021, and claims priority to European Patent Application No. 20203137.3, filed Oct. 21, 2020, the disclosures of each of which are hereby incorporated by reference in their entireties.

BACKGROUND

Field

The present disclosure relates generally to communication and, in particular, to coordination of multiple access points.

Technical Considerations

Wireless communication has been advancing over several decades now. Exemplary notable standards organizations include the 3rd Generation Partnership Project (3GPP) and IEEE 802.11, commonly referred to as Wi-Fi.

SUMMARY

Methods and techniques are described for group formation, in particular group formation and coordination scheme selection, of coordinated access points.

In some implementations, provided is a control apparatus for controlling coordinated communication by a plurality of access points of a wireless communication system. The control apparatus comprises an interface configured to receive a channel characteristic measured at a terminal device from a plurality of access points, and circuitry configured to determine, for one or more candidate groups of access points out of the plurality of access points for serving the terminal device, whether or not at least one backhaul link feature meets a requirement for coordinated communication, the requirement comprising at least one of a requirement for multi-link operation which the circuitry is configured to test if at least one access point out of the candidate group of access points operates with multiple active links, or a requirement for a coordination scheme out of one or more coordination schemes applicable to the terminal device, select a candidate group out of the one or more candidate groups as a group of access points for serving the terminal device in accordance with the result of the determining, and control, via the interface, the selected group of access points to serve the terminal device in coordinated communication.

In some implementations, provided is a control method for controlling coordinated communication by a plurality of access points. The control method is to be performed by a control apparatus and comprises receiving a channel characteristic measured at a terminal device from a plurality of access points, determining, for one or more candidate groups of access points out of the plurality of access points for serving the terminal device, whether or not at least one backhaul link feature meets a requirement for coordinated communication, the requirement comprising at least one of a requirement for multi-link operation which is tested if at least one access point out of the candidate group of access points operates with multiple active links, or a requirement for a coordination scheme out of one or more coordination schemes applicable to the terminal device, selecting a candidate group out of the one or more candidate groups as a group of access points for serving the terminal device in accordance with the result of the determining, and controlling the selected group of access points to serve the terminal device in the coordinated communication.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF DRAWINGS

An understanding of the nature and advantages of various embodiments may be realized by reference to the following figures.

Figure 1:
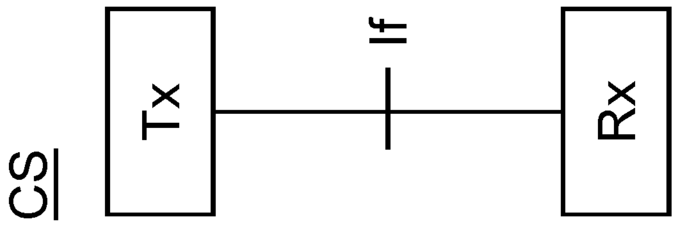
FIG. 1 is a block diagram illustrating a communication system.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

DESCRIPTION

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one."

Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

FIG. 1 illustrates an exemplary communication system CS in which Tx represents a transmitter and Rx represents a receiver. The transmitter Tx is capable of transmitting a signal to the receiver Rx over an interface If. The interface may be, for instance, a wireless interface. The interface may be specified by means of resources, which can be used for the transmission and reception by the transmitter Tx and the receiver Rx. Such resources may be defined in one or more (or all) of the time domain, frequency domain, code domain, and space domain. It is noted that in general, the "transmitter" and "receiver" may be also both integrated in the same device. In other words, the devices Tx and Rx in FIG. 1 may respectively also include the functionality of the Rx and Tx.

The present disclosure is not limited to any particular transmitter Tx, receiver Rx and/or interface If implementation. However, it may be applied readily to some existing communication systems as well as to the extensions of such systems, or to new communication systems. Exemplary existing communication systems may be, for instance the 5G New Radio (NR) in its current or future releases, and/or the IEEE 802.11 based systems such as the recently studied IEEE 802.11be or the like.

IEEE 802.11, commonly referred to as Wi-Fi, has been around for three decades and has become arguably one of the most popular wireless communication standards with billions of devices supporting more than half of the worldwide wireless traffic. The increasing user demands in terms of throughput, capacity, latency, spectrum and power efficiency calls for updates or amendments to the standard to keep up with them. As such, Wi-Fi generally has a new amendment after every 5 years with its own characteristic features. In the earlier generations, the focus was primarily higher data rates, but with ever increasing density of devices, area efficiency has become a major concern for Wi-Fi networks. Due to this issue, the last (802.11ax) and upcoming (802.11be) amendments have focused more on the efficiency issue.

Multi-AP coordination and multi-link operation (MLO) are two features proposed to improve the performance of Wi-Fi networks in the upcoming IEEE 802.11be amendment. Multi-AP coordination is directed toward utilizing (distributed) coordination between different APs to reduce inter-BSS (basic service set) interference for improved spectrum utilization in dense deployments. MLO, on the other hand, supports high data rates and low latency by leveraging flexible resource utilization offered by the use of multiple links for the same device.

Multi-access point (AP) coordination is quite similar in principle to the coordinated multipoint (CoMP) concept proposed for cellular networks proposed and standardized in 3rd Generation Partnership Project (3GPP) Rel-11. The clustering mechanism of CoMP is related to the group formation addressed in this disclosure. Moreover, the different coordination schemes being discussed in IEEE 802.11be amendment, also referred to as Wi-Fi 7, have their roots in the CoMP schemes.

Exemplary coordination schemes in Wi-Fi include CSR (coordinated spatial reuse), Co-OFDMA (coordinated OFDMA), CBF (coordinated beamforming), or JT (Joint Transmission). CSR may be used when inter-BSS (Basic Service Set) interference is weak, but the channel is perceived as busy. In Co-OFDMA, APs may coordinate their schedules in time and frequency. In CBF (or "Null-Steering") an AP targets to null its interference to neighboring STAs while forming beams to its served STA(s). In JT, (Joint Transmission or "Joint Transmission and Reception"), multiple APs may serve the same STA by creating a dynamic distributed MU-MIMO system.

Regarding coordination schemes in 3GPP cellular systems, Coordinated Scheduling is similar to CSR and Co-OFDMA. Moreover, in correspondence with Wi-Fi, 3GPP systems have coordination schemes CBF and JT. Moreover, in 3GPPP, dynamic point selection has been proposed where user data is shared between the different coordinating APs, but at each transmission time interval (TTI), only the best suited AP transmits to the user while the other APs are muted.

In general, a mechanism for AP grouping or clustering focuses on methods and processes of exchanging information and/or signaling between the coordinating nodes. Some approaches evolve around the indication of distributed multiple-input multiple-output (MIMO) capability of an AP to other APs in its coverage area or, similarly, consider "master" AP as the one responsible for transmitting messages advertising the multi-AP group and signaling exchanges related to other APs joining the group. Further, group formation is studied from the group identification perspective.

Wi-Fi 7 introduces the concept of multi-link operation (MLO), which gives the devices (APs and STAs) the capability to work on operate on multiple links (or even bands) at the same time. MLO introduces a new paradigm to multi-AP coordination which was not part of the earlier coordination approaches.

Multi-link operation (MLO) is considered in Wi-Fi-7 to improve the throughput of the network and address the latency issues by allowing devices to use multiple links. Multi-band and multi-channel under MLO, is illustrated in Ryuichi Hirata et al. (Sony Corporation), Discussion on Multi-band operation, IEEE 802.11-19/0818r0, July 2019. The former considers multiple links operating in different frequency bands (2.4 GHz and 5 GHz bands, for instance) while the latter considers the use of multiple channels within the same band.

A multi-link device (MLD) may have several "affiliated" devices, each affiliated device having a separate PHY interface, and the MLD having a single link to the LLC (Logical Link Control) layer. In the proposed IEEE 802.11be draft, a multi-link device (MLD) is defined as: "A device that is a logical entity and has more than one affiliated station (STA) and has a single medium access control (MAC) service access point (SAP) to logical link control (LLC), which includes one MAC data service" (see: LAN/MAN Standards Committee of the IEEE Computer Society, Amendment 8: Enhancements for extremely high throughput (EHT), IEEE P802.11be™/D0.1, September 2020, section 3.2). Connection(s) with an MLD on the affiliated devices may occur independently or jointly.

A preliminary definition and scope of a multi-link element is described in section 9.4.2.247b of aforementioned IEEE 802.11be draft. An idea behind this information element/container is to provide a way for multi-link devices (MLDs) to share the capabilities of different links with each other and facilitate the discovery and association processes. However, this information element may still be changed or new mechanisms may be introduced to share the MLO information, e.g., related to backhaul usage.

In multi-link operation (MLO) both STA and APs can possess multiple links that can be simultaneously active. These links may or may not use the same bands/channels. Due to the presence of multiple links, checking the backhaul status requirements becomes more particularly important in MLO. Thus, MLO may imposes additional or stricter requirements to the backhaul link in addition to the requirements in conventional coordinated multipoint (CoMP) or dual connectivity scenarios.

The present disclosure is related to the aforementioned aspects of the Wi-Fi technology, and is also applicable to 3GPP (cellular) networks comprising above-mentioned 5G New Radio (NR) in its current or future releases and other wireless communication standards.

While above-mentioned approaches are directed to providing information exchange and advertisement mechanisms related to multi-AP group formation, the present disclosure provides processes and mechanisms related to formation of the coordination group. Techniques for AP group formation and, in some embodiments, group formation and coordination scheme selection, are provided.

Moreover, the mechanisms provided by the present disclosure take into account that Wi-Fi 7 introduces the concept of multi-link operation (MLO), which gives the devices (APs and STAs) the capability to work or operate on multiple links (or even bands) at the same time. MLO introduces a new paradigm to multi-AP coordination which was not part of the earlier coordination approaches.

Moreover, coordination group formation and scheme selection are related to each other, i.e., the scheme may affect the group formation and vice versa. For instance, some schemes such as joint transmission (JT) requires very strict synchronization of the coordinating APs in both time and frequency domains. Therefore, the present disclosure takes the group formation into consideration and provides a mechanism to possibly optimize both of these decisions, group formation and scheme selection, at the same time. The disclosed apparatuses and methods build a scenario of how AP group formation may be related to multi-link operation and a selected coordination scheme.

The present disclosure provides a control apparatus for controlling coordinated communication by a plurality of access points (AP) of a wireless communication system.

Figure 2A:
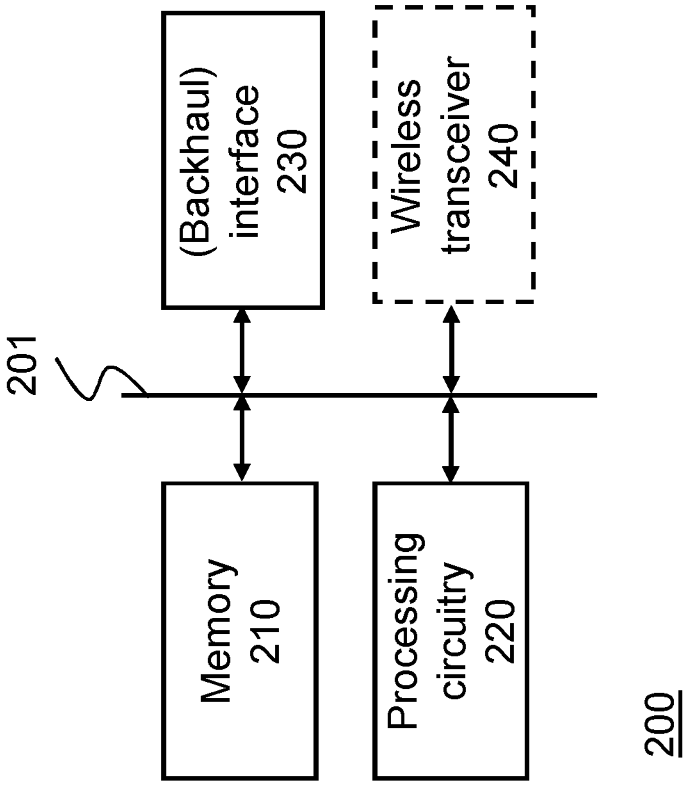
FIG. 2A is a block diagram illustrating a control device.
Figure 3:
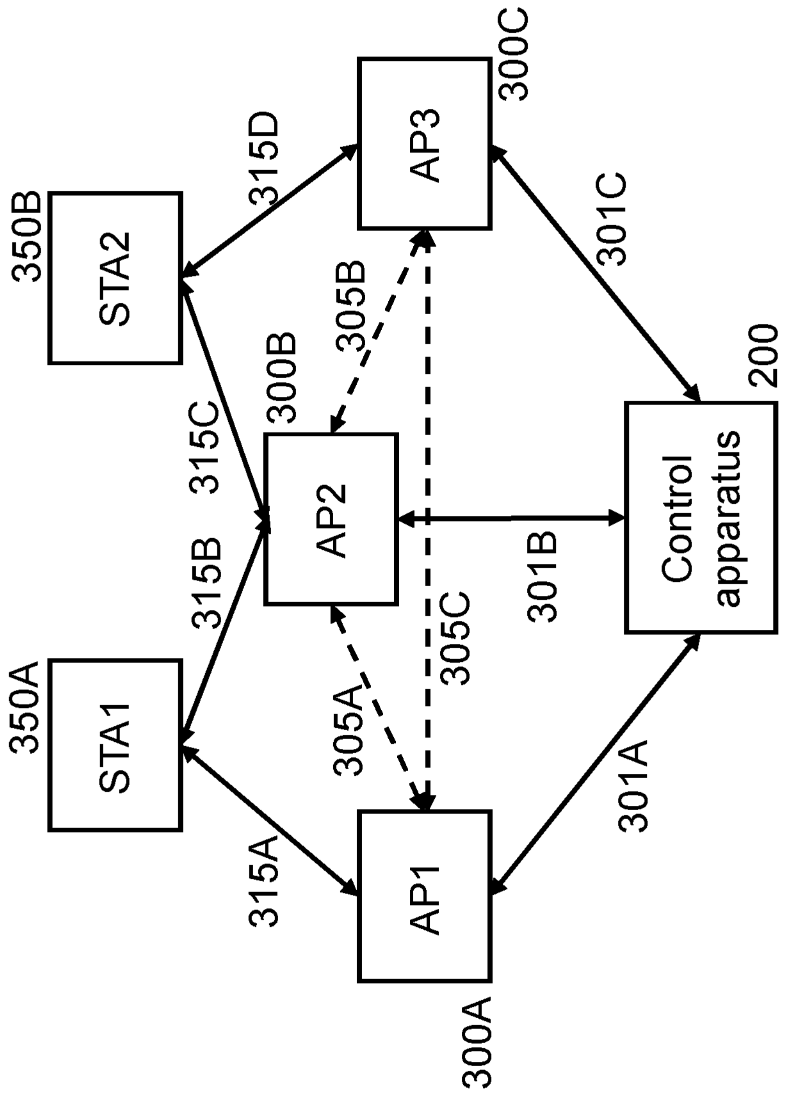
FIG. 3 is a block diagram illustrating a communication system.
Figure 4:
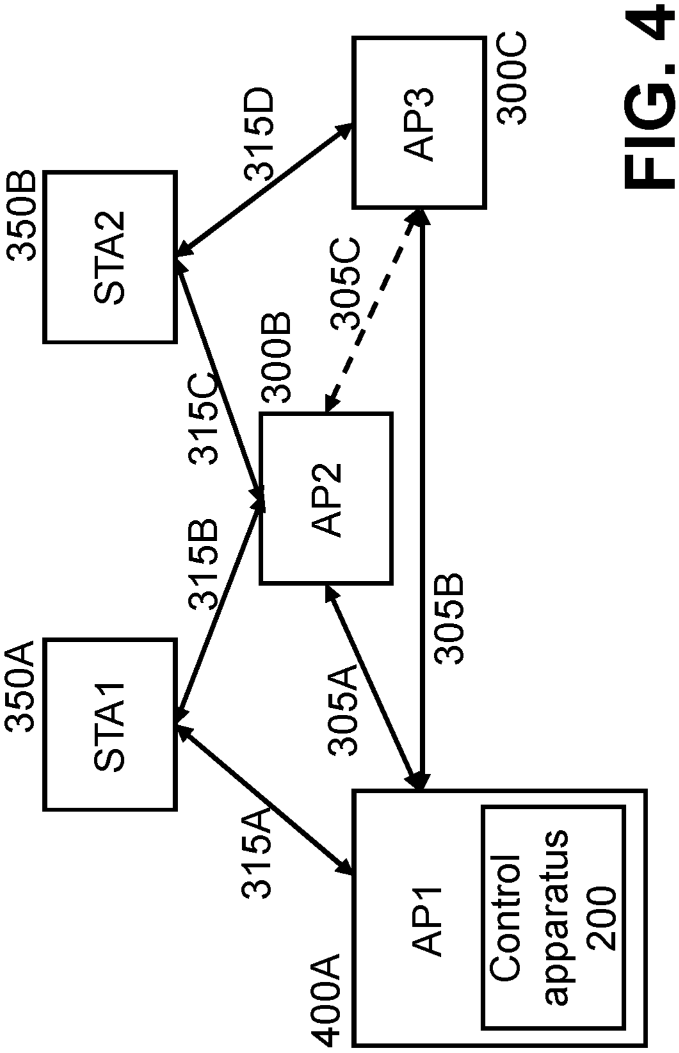
FIG. 4 is a block diagram illustrating a communication system.

A control apparatus 200 is shown in FIG. 2A. Moreover, wireless communication systems are illustrated in FIGS. 3 and 4.

The control apparatus 200 comprises an interface 230 and circuitry 220, which may comprise at least one of processing circuitry and control circuitry.

The interface is configured to receive a channel characteristic measured at a terminal device 350A from a plurality of APs 300A-C.

The circuitry 220 is configured to determine (or test), for one or more candidate groups of access points out of the plurality of access points for serving the terminal device, whether or not at least one backhaul link feature or link feature meets a requirement for coordinated transmission.

The backhaul link feature or link feature is a feature of a (backhaul) link. The requirement for coordinated communication comprises at least one of:

- a requirement for multi-link operation which the circuitry is configured to test if at least one access point out of the candidate group of access points operates with multiple active links, or
- a requirement for a coordination scheme out of one or more coordination schemes applicable to the terminal device.

The circuitry 220 is further configured to select a candidate group out of the one or more candidate groups as a group of access points for serving the terminal device 350A. The selection is performed in accordance with the result of the determination whether the requirement for coordinated transmission is met. Moreover, the circuitry 220 is configured to control, via the interface 330, the selected group of access points in performing coordinated communication with the terminal device.

FIG. 2A illustrates a control apparatus 200 according to some embodiments. The control apparatus 200 comprises memory 210, processing circuitry 220, and an interface or backhaul interface 230, which may be capable of communicating with each other via a bus 201. In addition, control apparatus 200 may include a transceiver 240, which has the functionality of transmitter and receiver and may e.g. be a wireless transceiver.

In wireless communication systems, there are two types of links. On the one hand, access links are links between a terminal device and an access point. On the other hand, backhaul links are links between different infrastructure elements, such as control apparatuses and access points. Accordingly, in the present disclosure, a backhaul link may be a backhaul link between control apparatus 200 and one of a plurality of access points, or a backhaul link may be a link between two communication apparatuses.

The control device 200 may be implemented as a separate device or entity which does not serve as an access point, e.g., a standalone device. This case is shown in FIG. 3. For instance, as can be seen in FIG. 3, a backhaul link comprises one or more backhaul links 301A-C connecting the control apparatus 200 with each of the plurality of APs 300A-C (AP1, AP2, AP3). As is further shown, the backhaul link may optionally comprise further backhaul links 305A-C connecting access points AP1-AP3 (see the dashed lines in FIGS. 3 and 4 for optional backhaul links between APs). Moreover, the APs communicate with the terminal devices 350A-B over wireless interface or wireless channel 315A-D corresponding to interface If shown in FIG. 1.

Alternatively, as illustrated in FIG. 4, the control apparatus 200 may be integrated within an AP 400A out of the plurality of APs, which communicates with one or more terminal devices or apparatuses using wireless transceiver 240.

In the present disclosure, the term "backhaul link features" refers to link features such as a backhaul availability of backhaul links between control apparatus 200 and the plurality of terminal devices AP1-3, and may further comprise link features of backhaul links between the respective APs.

Accordingly, the present disclosure also provides an AP 400A for performing coordinated communication with one or more terminal devices, the AP comprising control apparatus 200.

The memory 210 may store a plurality of firmware or software modules, which implement some embodiments of the present disclosure. The memory 210 may be read from by the processing circuitry 220. Thereby, the processing circuitry may be configured to carry out the firmware/software implementing the embodiments. The processing circuitry 220 may comprise one or more processors. In some embodiments, the processing circuitry 220 performing the functions described herein may be integrated within an integrated circuit on a single chip.

Figure 2B:
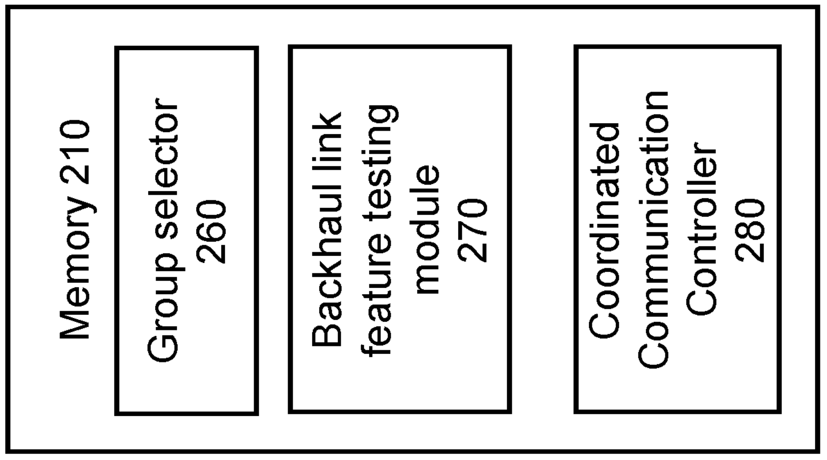
FIG. 2B is a block diagram illustrating modules of a memory.

FIG. 2B shows a schematic functional block diagram of the memory 210 and the functional code parts stored therein. The functional code parts, when executed on the processor(s) or processing circuitry 220, perform the respective functions as follows. Application code 270 implements a testing module for testing whether a backhaul link feature meets a requirement for coordinated communication, application code 260 acts as a group selector for selecting a group of APs, and application code 280 act as a controller of coordinated communication by the plurality of APs.

The wireless transceiver 240 may comprise a power amplifier PA module and an antenna module. The PA module may comprise one or more power amplifiers for amplifying signal to be transmitted from the respective one or more antennas of the antenna module. The wireless transceiver may correspond to any known wireless transceiver. It may comprise further components. Moreover, the wireless transceiver 240 may also implement a wireless receiver portion for receiving signals.

Figure 5A:
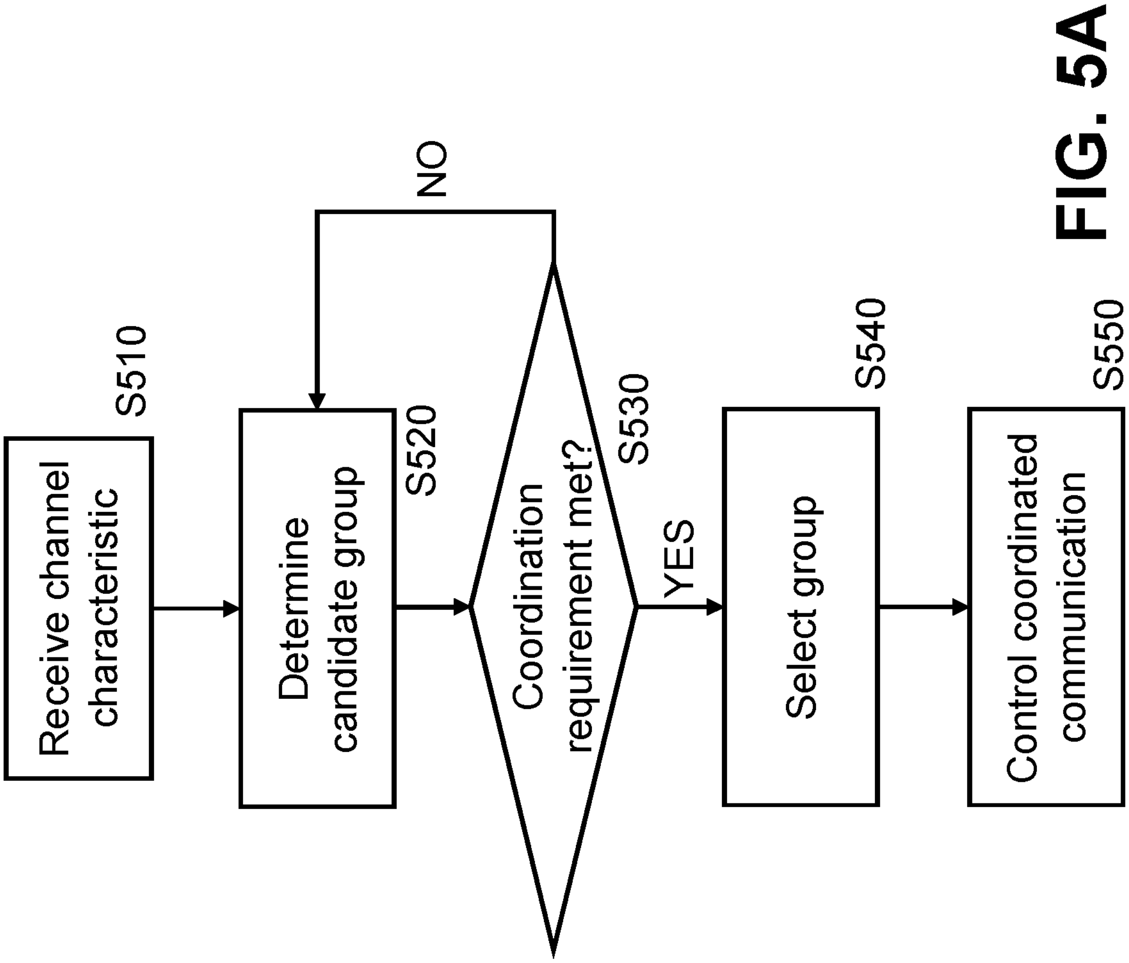
FIG. 5A is a flow chart illustrating a control method.

In correspondence with control apparatus 200, provided is a control method for controlling coordinated communication by a plurality of access points, comprising the following method steps shown in FIG. 5A to be performed by a control apparatus.

The method comprises a step S510 of receiving a channel characteristic measured at a terminal device from a plurality of access points. The method further comprises a step S530 of determining (or testing), for one or more candidate groups of access points out of the plurality of access points for serving the terminal device, whether or not at least one backhaul link feature of a backhaul link meets a requirement for coordinated communication. The requirement comprises at least one of a requirement for multi-link operation which is tested if at least one access point out of the candidate group of access points operates with multiple active links, or a requirement for a coordination scheme out of one or more coordination schemes applicable to the terminal device. The method further comprises a step S540 of selecting a candidate group out of the one or more candidate groups as a group of access points for serving the terminal device in accordance with the result of the determining (or testing). In addition, the method comprises a step S550 of controlling the selected group of access points to serve the terminal the terminal device in the coordinated communication.

Also provided is a wireless communication system comprising the control apparatus according to any embodiment, and a plurality of access points configured to share data and channel state information and perform coordinated communication of the shared data. Further provided is a corresponding communication method for the communication system.

In this disclosure, details, examples and embodiments of the techniques provided herein are to be understood as referring both to the apparatuses as well as the corresponding methods provided.

As mentioned, a wireless communication system in accordance with the present disclosure may be a Wi-Fi system or a 3GPP communication system, or any other wireless communication system providing for coordinated transmission or communication from a plurality of APs to a terminal device. The term "access point (AP)" not only refers to an access point in Wi-Fi, where this terminology is commonly used, but should be understood to also comprise any wireless base station or transmission and reception point (TRP) in a wireless communication system, such as an eNodeB in LTE technology or a gNodeB of 5G. Accordingly, communication by a plurality of access points comprises, for instance, coordinated transmission, multi-AP coordination, multi-TRP communication, or coordinated multi-point transmission. Furthermore, communication by a plurality of APs comprises transmission to one or more terminal devices on the downlink as well as reception on the uplink from the terminal devices, wherein each of one or more terminal devices may communicate with a plurality of APs. Moreover, a terminal device may be referred to, for instance as a station (or "STA", for short), user terminal, or user equipment, and may comprise a mobile or cellular phone, tablet device, personal computer, notebook, repeater, connected and/or autonomously driving vehicle, or any connected IoT ("internet of things") device. Accordingly, like "AP", the term "STA" should be understood to refer to any wireless communication device served by a wireless AP.

The interface 230 may be a backhaul interface over which the control apparatus 200 receives the channel characteristic from an AP or a plurality of APs. For instance, the STA measures the channel characteristic for each AP from which it receives a signal. Therein, the channel characteristic may comprise a power measurement of a received power level such as an average received reference signal power level, a signal to (interference and) noise ratio (SINR/SNR), received signal strength indicator (RSSI), or a distance to the respective access points. The STA then transmits the channel characteristic such as average received power level to one of the APs out of the plurality of APs, e.g., an AP with a "best" channel characteristic such as a highest average received power level or shortest measured distance. Any AP from among the plurality of APs which receives a channel characteristic from a STA then transmits the channel characteristic to control apparatus 200 over the backhaul. However, control apparatus 200 may also receive the channel characteristic directly from a STA, particularly if control apparatus 200 is integrated in an acts as one of the plurality of APs, and the STA measures the strongest signal power from said AP comprising the control apparatus. Accordingly, in addition to a backhaul interface, interface 230 of control apparatus 200 may comprise a wireless interface. Furthermore, a backhaul connection or backhaul link between control apparatus 200 and the plurality of APs as well as the backhaul link between the APs may be a fiber backhaul, wired backhaul, or a wireless backhaul, e.g., a frequency spectrum different from a frequency spectrum used for the wireless communication between APs and STAs.

Based on the received channel characteristic measured by a given STA, e.g., through power measurement, circuitry 220 of the control apparatus 200 may determine, in step S520, a set of candidate APs, which are possible APs for serving the STA in coordinated transmission. E.g., a set of candidate APs are a plurality of APs exceeding a threshold level of the channel characteristic, such as a power threshold. Out of the set of candidate APs, circuitry 220 forms (e.g., selects or determines) a candidate group for serving the terminal device. For instance, the number of APs in a candidate group may be limited by a maximum allowable (or allowed) group size.

As mentioned, control apparatus 200, using circuitry 220, determines for a candidate group of access points whether or at least one backhaul link feature meets a requirement for communicated communication. In this disclosure, the term backhaul link feature refers to a link feature of a link connecting a plurality of access points. Backhaul link features, which may be tested, comprise a backhaul availability, e.g. at least one of a backhaul bandwidth or a backhaul latency. In addition, in this disclosure, a backhaul link feature tested may further comprise a synchronization among the plurality of access points.

It is noted that synchronization among a plurality of access points is a requirement for coordinated communication over a wireless carrier with a STA. To perform coordinated communication with the STA, the RF (radio frequency) carrier needs to be synchronized between the different APs. For instance, phase, time, and frequency may need to be synchronous. A common backhaul between a plurality of APs may facilitate synchronization of the carrier. Moreover, for a plurality of access points, which are connected via a backhaul link, to perform coordinated communication with an AP, it is necessary that the APs are synchronized. For this reason, in this disclosure, the one or more backhaul link features may comprise, in addition to a backhaul availability such as a bandwidth and/or latency of the backhaul link, a synchronization among the access points to perform the coordinated communication.

As shown in FIG. 5A, in step S520, the circuitry 220 of control apparatus 200 forms (e.g. selects or determines) a candidate group of access points out of the candidate APs for which the channel characteristic(s) has been measured by the STA and reported. As is further shown in FIG. 5A, if it is determined in step S530 that for the selected candidate group, the coordination requirement is met, circuitry 220 may select the candidate group as a group for serving the AP in coordinated communication (YES). However, if it is determined that for the candidate group, the coordination requirement is not met, the method returns to step S520 and circuitry 220 determines a new candidate group based on the received channel characteristic. Accordingly, a control method may comprise repeating determination of a candidate group, or reselecting candidate group(s) until for one candidate group out of one or more candidate groups selected in the repeated selection, the backhaul link feature(s) meet the requirement for coordinated communication.

When such repetition of candidate group determination needs to be performed in step S520, the circuitry determines whether the coordination requirement is met for a first candidate group out of the plurality of APs and, after reselection for a second group out of the plurality of APs which are formed in the repeated selection in step S520.

In some embodiments, if the circuitry 220 determines that for a first candidate group, the backhaul link does not meet the requirement for coordinated communication, circuitry 220 is configured to increment a maximum allowed group size of the group of access points and form, when repeating step S520, a second candidate group out of the plurality of candidate APs not larger than the incremented maximum allowed group size. For instance, a group size of the first candidate group may not exceed a current maximum allowed group size (e.g. an initial, e.g., predetermined, maximum allowed group size if no reselection of candidate groups has yet been performed), and after incrementing, the group size of the second candidate group may not be larger than the incremented group size.

The one or more candidate groups, possibly comprising both a first candidate group and the second candidate group determined by reselection, may be determined based on the channel characteristics, e.g., comprising one or more measures of channel characteristic or channel quality out of above-mentioned average received reference signal power level, a signal to (interference and) noise ratio (SINR/SNR), distance between STA and AP, or further measures.

In accordance with the present disclosure, determination of a group of access points may be performed for one or more STAs (a single terminal device as well as a plurality of terminal devices), e.g., terminal devices 350A-B denoted STA1 and STA2 in FIGS. 3 and 4. Therein, a group comprising access points AP1 and AP2 is selected to serve a first terminal device 350A (STA1), and a group comprising access points AP2 and AP3 is selected to serve terminal device 350B (STA2). If a plurality of terminal devices is present in the wireless network or communication system, each of the plurality of terminal devices measures the channel characteristics respectively for the plurality of access points and reports the measurement to one access point, which forwards it, e.g. via backhaul, to control apparatus 200. In case of a plurality of STAs, circuitry 220 of control apparatus 200 may perform selection (and possibly reselection, if necessary due to the result of determining whether the requirement for coordinated communication is met) of a candidate group of APs, determination whether or not the requirement for coordinated communication is met, and selection of the candidate group as a group for serving the access point, for each of the plurality of STAs.

Testing of the requirement(s) (determining whether the backhaul link feature(s) meet the requirement for coordinated communication) may comprise one or both of a test for the whole plurality of group candidates formed for the plural STAs, or testing respectively per STA, e.g., for each candidate group formed respectively for one of the STAs.

Figure 5B:
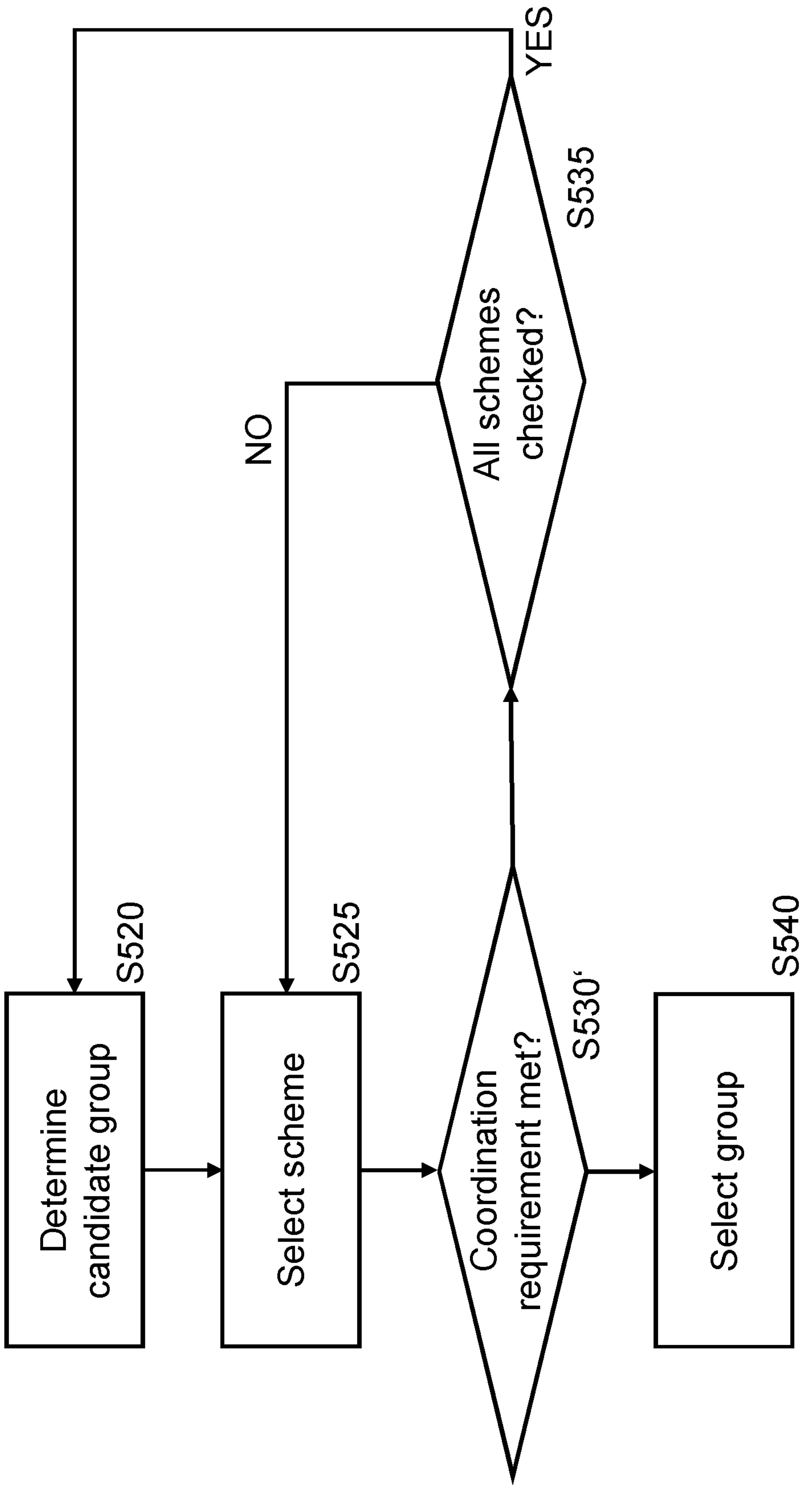
FIG. 5B is a flow chart illustrating a part of a control method.

In particular, determining whether the backhaul link features meet the requirement for multi-link operation may be performed for a plurality of STAs in a single run. On the other hand, a determination whether the backhaul link features meet a requirement for the coordination scheme may be performed respectively for each of a plurality of STAs and its corresponding candidate group of APs. This is shown in FIG. 5B, which shows an embodiment of part of the method shown in FIG. 5A between steps S520 and S540. In particular, for a given candidate group for serving the STA, one or more coordination schemes may be preselected based on a criteria such as performance or overhead. In particular, in the pre-selection, a benefit metric may be used as a measure to quantify a tradeoff between performance and overhead. Further, the benefit metric may be used to rank the preselected coordination schemes with regard to this tradeoff. One of the pre-selected coordination schemes is selected, S525, and for this coordination scheme, it is determined whether the backhaul link features (e.g. backhaul availability and/or synchronization) meet the requirement for this coordination scheme (S530' as an example of Step 530 from FIG. 5A). If not, it is and not all pre-selected schemes have been tested (S535), another pre-selected scheme from the preselected schemes is taken. If all schemes have been checked, and for none of the preselected schemes the backhaul link features have been found to meet the requirement for coordinated communication, the method returns to step S520, and a new candidate group is selected for each of the one or more STAs.

A control apparatus 200 in accordance with the present disclosure forms part of a system comprising the control apparatus 200 and a plurality of access points. Control apparatus 200 and access points (APs 300A-C or 400A, 300B-C) act in a group formation and selection process, possibly comprising a coordination scheme selection process in a network such as a Wi-Fi network or cellular network. Different exemplary steps of this process are shown in FIGS. 6A-6D.

Preceding the group formation and selection, in step S610, the total number of STAs and APs may be defined. For instance, variable names Num_STA and Num_AP may respectively be used. For instance, a total number of APs is a number of APs connected to one another via backhaul, and a total number of STAs is a number of STAs that have established a connection with one of the APs. As mentioned the number of STAs may be one or greater than one.

In step S615, each STA reports the channel characteristics such as average received reference signal power level(s) of signals received, respectively from the plurality of APs, to one AP, which may be a "best serving AP" for the STA such as an AP with a highest average received power level. E.g., a STA reports the channel characteristics for each AP from which it receives a signal or sufficiently strong signal for performing the measurement of channel characteristics. Reported signal levels from each STA are sent to control apparatus 200 (which may be referred to as "control unit") via backhaul such as a fiber backhaul, wired backhaul, or wireless backhaul. Control apparatus 200 receives the channel characteristics in accordance with above-described step S510 from FIG. 5A, either via backhaul or, if integrated into an AP receiving a channel characteristic from a STA, via wireless transceiver/interface.

Then, in step S620, control apparatus S620 picks candidate APs for each STA based on power constraints. E.g., for each STA that has transmitted a measurement of the channel characteristic, a set of candidate APs is determined. The serving AP to which a STA has transmitted its power/channel measurement as well as one or more APs for which the STA has measured channel characteristics or power levels within a range of the serving AP's received power level may be comprised in a candidate AP set for the STA. For instance, a minimum power threshold may be applied to avoid comprising APs with lower received power levels in the coordinated AP group unnecessarily.

In step S625, a maximum cluster size or maximum allowed group size may be initialized. For instance, an initial value (e.g. the same initial value) may be set for all of the plurality of terminal devices and their respective serving AP groups to be determined. E.g., a variable such as Max_Cluster_Size may be set. However, the maximum allowable group size need not be initialized with a same initial value for all groups. For instance, different classes of terminal devices may be assigned different maximum serving group sizes, e.g., in accordance with service requirements such as latency requirements. However, as will be further described, the cluster size or maximum allowed group size may be designed to dynamically change for each STA.

Here maximum cluster size or maximum allowed group size means that the maximum allowable AP cluster size in the system for serving any STA. E.g., if the maximum cluster size is 4, STA(s) may be served by 1AP, 2APs, 3APs, or 4 APs. However, no STA may be served by more than 4 APs. An optimal cluster size may depend on factors comprising a tradeoff between the interference cancelation benefit and the channel overhead, which may both be higher for larger clusters. For instance, in step S625, the initial maximum cluster size (Max_Cluster_Size) may be set to 2 for starting group formation in step S630. If the maximum cluster size is designed to dynamically change, it may be increased if this is important.

Then, in step S630 (corresponding to step S520 of FIG. 5A), for each STA, a coordinated AP candidate group is formed or determined. If a maximum allowed number has been defined, this forming of coordinated AP candidate groups is performed in such a way that the number of APs in a coordinated AP group candidate does not exceed the maximum allowable cluster size. One way is to select the APs for a given STA for which the highest values of measured power has been reported. However, other criteria may be considered as well, e.g., one AP may not exceed a maximum number of candidate groups to be included in.

In the group formation or clustering of access points, received reference signal power (RSRP, reference signal received power), a signal to (interference and) noise ratio (SNR/SINR), or other metrics such as received signal strength indicator (RSSI) or reference signal received quality (RSRQ) may be considered as a power measurement metric or metric for quantifying the power measurement or channel characteristic.

Moreover, a heterogeneous scenario may be considered, where M small base stations are deployed in the coverage of a macro base station or base station(s). In such a scenario, access points are classified into macro base stations and small base stations (e.g., "Micro cells/base stations or femto cells/base stations). For instance, a central control unit (CCU) as control apparatus 200 may be deployed in the macro base station. However, the present disclosure is not limited to any hierarchy among access points. Since the disclosure is not limited to any scenario regarding such hierarchy, the CCU/control apparatus 200 may be deployed in a coordinator base station as a more general term, or, as mentioned, as a separate device/entity.

In step S635, an objective of group formation may be selected. For instance, a main group formation objective (GFO) is defined, or a combination of or tradeoff between two or more group formation objectives. As exemplary group formation objectives one or more out of load balancing, energy efficiency, spectral efficiency, and/or backhaul optimization may be considered.

If the requirement for coordinated multi-link operation comprises a requirement of multi-link operation, it may be determined (e.g., checked or tested) in step S640 if at least on access point out of the AP candidate groups formed in step S630 operates with multiple-active links. For instance, in case of existence of AP-MLD(s) in the system, or in particular, among the one or more selected candidate AP groups, an MLO information element may be used to evaluate the AP-MLDs' situation in terms of multi-link activation, e.g., determine whether multiple links for at least one AP-MLD are active. For instance, the aforementioned multi-link element from the IEEE P802.11be standard may be used. In case no AP-MLD with two or more active links is identified, the candidate groups formed in step S630 may be used for the further process steps without changes being necessary.

On the other hand, if it is determined that one or more AP-MLDs with two or more active links exist in the AP candidate groups, the backhaul link features, e.g., above-mentioned backhaul availability in terms of latency and bandwidth, and/or a synchronization of APs within a candidate group, should be checked or tested, S645, in particular if the backhaul links are independent and no common control (e.g., different data from multiple STAs may be transmitted or received over the different links) between the different active links is performed. If no issues in the AP-MLDs' backhaul and/or synchronization are determined in step S645, the process may still continue with the previously determined AP candidate groups.

Otherwise, if the backhaul link features are determined not to meet the requirement for multi-link operation, re-clustering (returning to step S630 of forming new candidate groups) is performed. Such re-clustering may be performed with increasing the maximum allowable cluster size.

For instance, if the circuitry 220 of the control apparatus 200 determines that at least one backhaul link feature does not meet the requirement for multi-link operation, the circuitry 220 may increment the maximum allowable group size. For instance, the maximum allowable group size may be incremented commonly for all for all of the plurality of terminal devices (or STAs). Alternatively, a maximum allowed group size may be incremented only for STAs to which a candidate group comprising an AP-MLD has been assigned. Still alternatively, one or more attempts of repeating forming of candidate groups in step S625 may be performed without increasing a maximum allowed number of APs per group or before increasing the maximum allowed number/group size.

Figure 6A:
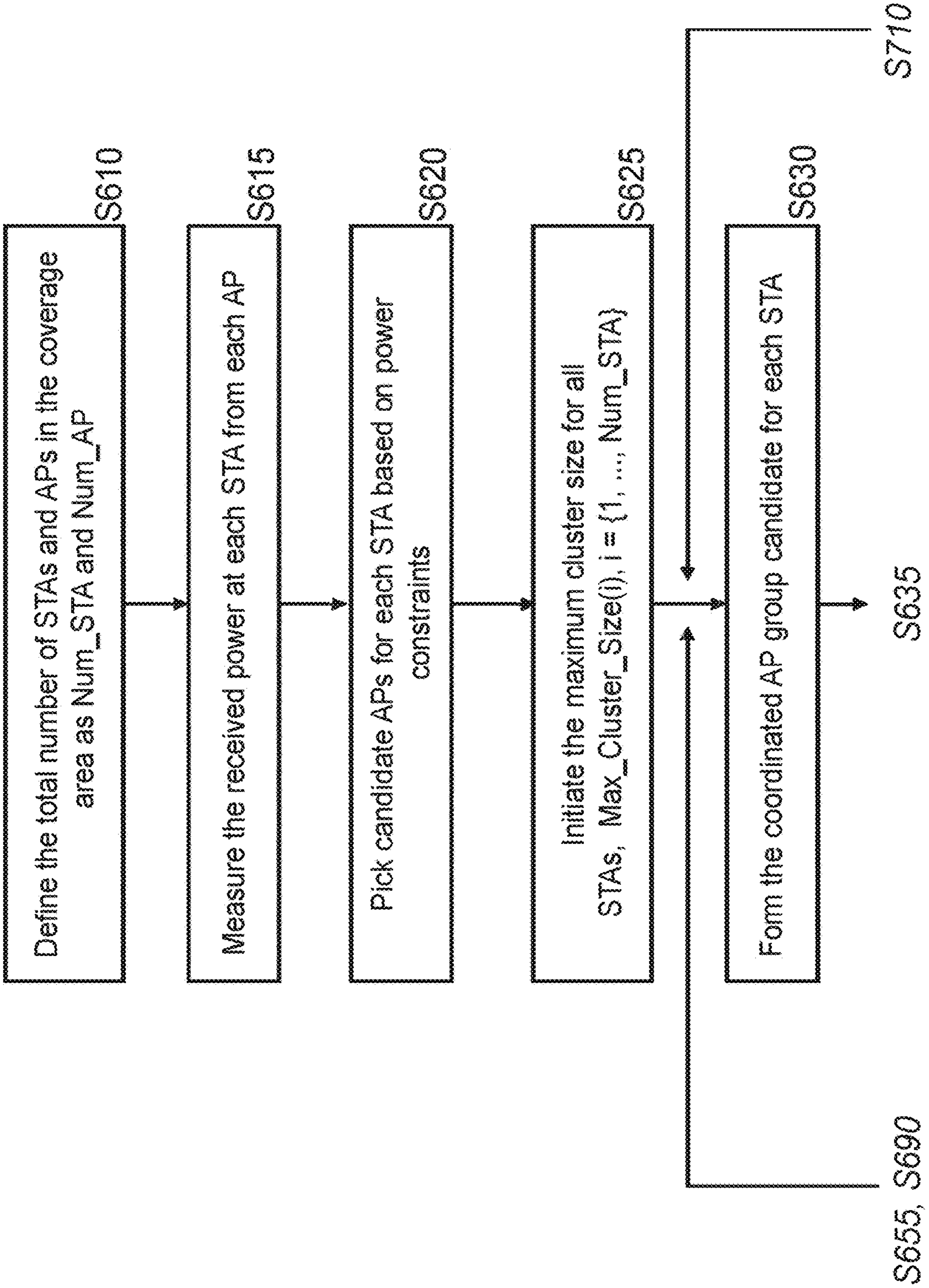
FIGS. 6A-6D are flow charts illustrating steps of a group formation and coordination scheme selection process.
Figure 6B:
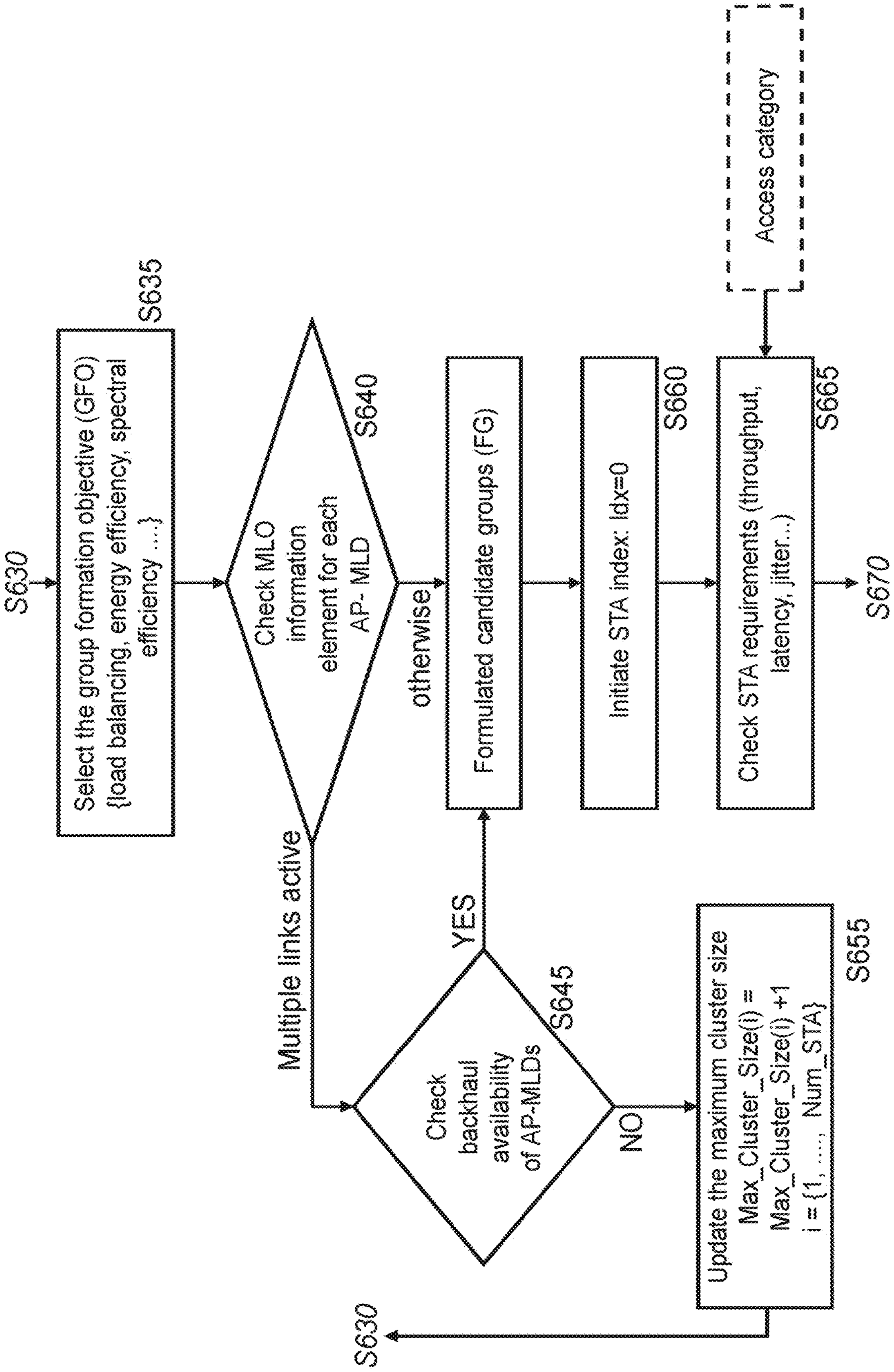

The aforementioned steps of FIGS. 6A and 6B describe candidate group formation, which is performed for each STA in the system, e.g., each STA that has transmitted a measured channel characteristic to one AP. As mentioned above, a requirement for coordinate coordination may comprise a requirement for a coordination scheme. Coordination schemes may be set individually per STA/per AP group to serve the STA.

The following steps describe selection of the best coordination scheme for each STA and the corresponding (candidate) group of APs, which may be performed in a loop running over the STAs. In step S660, the STA index may be initialized or initiated, e.g., Idx=0.

In step S665, requirements for a STA are checked for the selection of a coordination scheme, which may be service requirements or channel requirements. Possible requirements comprise throughput, latency, or jitter for said terminal device. For instance, one or more requirements for a STA may be extracted from a parameter or parameters such as traffic identity (TID) or access category. In the case of cellular networks, as an alternative to access category or TID, fields like 5G QoS identifier under the 3GPP standardization (e.g., 3rd Generation Partnership Project (3GPP), System architecture for the 5G System (5GS); Stage 2 (Rel-16), Technical Specification 23.501, version 16.5.1, August 2020) may be used to extract requirements such as throughput, latency, reliability, etc.

Following this, the link quality may be determined in step S670 between the STA and the APs forming the coordinated candidate AP group for said STA. Possible link quality metrics comprise channel characteristics comprising any of the above mentioned channel characteristics or signal power metrics such as a distance (or distances) between the STA and APs, received signal strength indicator (RSSI), and signal to interference and noise (SINR) values.

Then, in step S675, one or more of different coordination schemes may be selected depending on the STA's requirements, to be selected as candidates for a coordination scheme to be used for the STA. For instance, the circuitry 220 of control apparatus 200 is configured to select the one or more coordination schemes based on a requirement of at least one of throughput, latency, reliability, or jitter for said terminal device, the measured channel characteristic. For instance, a benefit metric indicating a tradeoff between performance and overhead may be used in the selection of one or more coordination schemes. As a result, one or more coordination schemes are determined to meet the STA's requirements such as service requirements, which may be determined by control circuitry 220 of apparatus 200 based on at least one of throughput, latency, reliability, or jitter for said terminal device, the measured channel characteristic, and a benefit metric indicating a tradeoff between performance and overhead.

For instance, coordination schemes to be considered in the selection may comprise one or more out of CSR (coordinated spatial reuse), Co-OFDMA (coordinated OFDMA), CBF (coordinated beamforming), or JT (Joint Transmission) of Wi-Fi mentioned above, or corresponding schemes in 3GPP systems.

Then, in step S680, the backhaul link features (e.g., backhaul availability such as bandwidth and latency and/or synchronization) are checked to determine whether they meet a requirement for the selected coordination scheme and whether the selected scheme can be supported or not. If more than one coordination scheme have been selected in step S675 as possible coordination scheme candidates, the determination regarding the backhaul link features in step S680 may be repeated if the requirement is determined not to be met for one or more of the selected coordination schemes. After each negative determination, it may be checked whether all possible coordination schemes selected for the respective STA have been checked.

If the circuitry 220 of control apparatus 200 determines that the tested backhaul link features do not meet the requirement for the coordination scheme currently tested, it may increment the maximum group size for the terminal device in step S690. Here, the incrementing may be performed respectively per terminal device, possibly resulting in different maximum allowed AP group sized for different terminal devices. However, also after the check of the backhaul link feature(s) with respect to the coordination scheme, the incrementing of the maximum allowed group size may alternatively be performed commonly for all STAs, or it may be attempted to form groups with the same maximum number before incrementing the maximum number.

As mentioned above, in addition to backhaul bandwidth and latency, other criteria such as synchronization can be considered as backhaul link features to be tested for scheme selection in multi-AP coordination scenarios. This is important because the synchronization requirements of the different schemes may vary. For instance, coordinated spatial reuse (CSR) requires frame-level synchronization, coordinated OFDMA (Co-OFDMA) and coordinated beamforming need symbol-level synchronization, while joint transmission (JT) additionally needs strict time and phase synchronization.

However, if a plurality of coordination schemes has been determined in step S675 to appropriate in terms of the STA's requirements, e.g., by checking above-mentioned benefit metric to see which schemes provide a sufficient performance vs overhead tradeoff and selected as candidate coordination schemes, the circuitry 220 may perform the determination regarding the backhaul availability or, more generally, backhaul link features, for more than one of these candidate coordination schemes. In case the backhaul link features do not meet a requirement for coordinated communication for one communication scheme, it is tested in step S685 whether all possible coordination schemes have been checked, and if not, another possible coordination scheme is selected for the testing of the backhaul link features of step S680. Accordingly, before incrementing the maximum allowed group size for said terminal, the circuitry 220 determines, for each of the one or more coordination schemes applicable to the terminal device, whether or not the at least one backhaul link feature meets the requirement for the respective coordination scheme.

In other words, there are two important steps related to scheme selection. One step (S675) is to check the "benefit metric" to see which schemes provides the best performance vs. overhead tradeoff and then, a further step (S680) is checking the backhaul link feature(s) (e.g., backhaul availability and/or synchronization) if they are capable of supporting the said scheme.

However, in case all possible coordination schemes have been checked and none of them satisfy the backhaul requirements, e.g., for none of them, the backhaul link features meet the requirement for the coordination scheme, the maximum cluster size may be increased in step S690, and re-clustering or forming of new candidate groups for the plurality of STAs is performed by returning to step S630. On the other hand, if one of the coordination schemes has been determined to be sufficient enough in terms of backhaul, or consequently, the backhaul link feature(s) meet the requirement of the coordination scheme for coordinated communication, the algorithm or process may move to the next STA in step S495, e.g. by updating the STA index from Idx to Idx+1.

In case of a plurality of STAs, the above steps S665 to S685 for selecting and testing a coordination scheme, are repeated until for each STA, a respective AP group candidate with a corresponding coordination scheme (the "best" or optimal coordination scheme) have been found (e.g., in the algorithm, the index running over the STAs may be determined in step S700 to be greater than the number of STAs, Num_STA, or Num_STA−1, depending on whether the iteration starts at one or zero).

Accordingly, at this stage, each STA has been provided with a candidate group of APs for serving the STA and a corresponding coordination scheme. Now, for the determined set of candidate groups and corresponding coordination schemes, the objective of AP group formation may be evaluated, e.g., it is determined whether the present set of AP group candidates in connection with their corresponding coordination schemes satisfy the GFO determined in step S635.

Accordingly, in addition to the requirement for coordinated communication tested in one or both of steps, S645 and S680, the circuitry 220 of control apparatus 200 determines, in step S705, whether the candidate group(s) for the STA(s) meet the group formation objective. If not, then the circuitry may increment or update the maximum size for candidate groups, e.g. commonly for all STAs since the evaluation of the GFO is performed for the candidate groups and possibly the coordination schemes as a whole, and form a new candidate group. Therein, if new candidate groups are formed, for a given STA for which a first and possibly a second candidate group have previously been formed and tested, a third candidate group may be formed in case of a negative outcome of the evaluation of the GFO with an increased maximum allowed number of APs per group.

For instance, the circuitry 220 may increment the maximum allowed group size and form new candidate group(s) corresponding to the "third" candidate group if the circuitry determines that a combination of the first candidate group and a selected coordination scheme out of the one or more coordination schemes for which the at least one backhaul link feature meets the requirement for coordinated communication does not meet the group formation objective.

In case the group formation objective is not satisfied, the maximum cluster size for all STAs may be incremented by one in step S710 and group candidate formation (and possibly coordination scheme selection) is repeated until the group formation objective is determined to be satisfied in the evaluation in step S705.

When the group formation objective is satisfied, the candidate groups for which the objective is satisfied are selected as the groups for serving the respective STAs. Control circuitry 220 controls, via interface 230, the groups of access points selected for each STA to exchange and share the necessary data and/or channel state information (CSI) between the coordinating APs out of the respective group of APs, step S720, and to serve the STA in coordinated communication (transmission and/or reception), e.g. proceed with coordinated transmission.

The present disclosure is not limited to the above-described number and order of steps shown in FIGS. 6A-6D. For instance, step S630 of selecting the group formation objective may be performed before determination of the candidate groups in step S625. The same GFO may for instance be kept even when new AP candidate group candidates need to be formed.

Figure 6C:
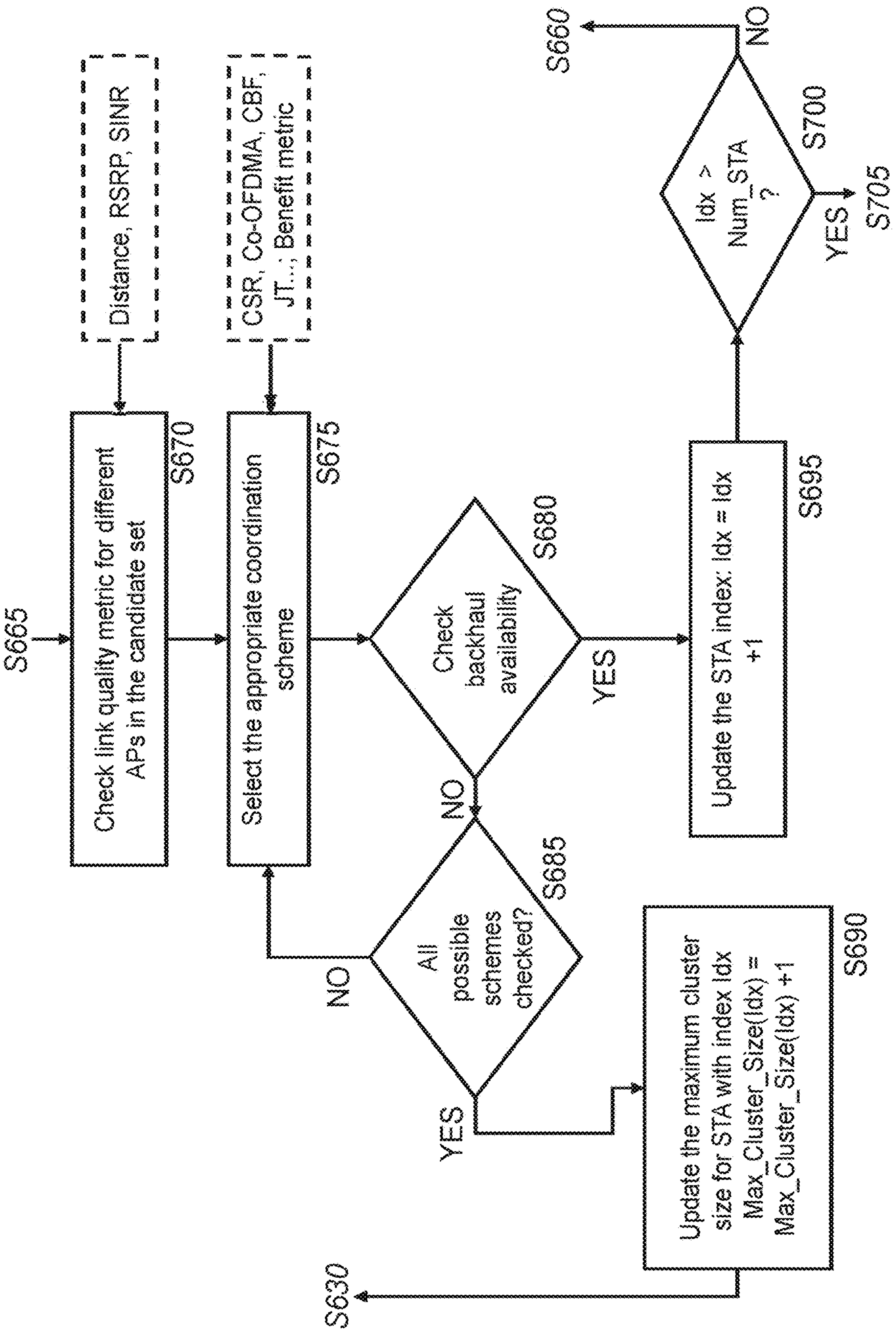
Figure 6D:
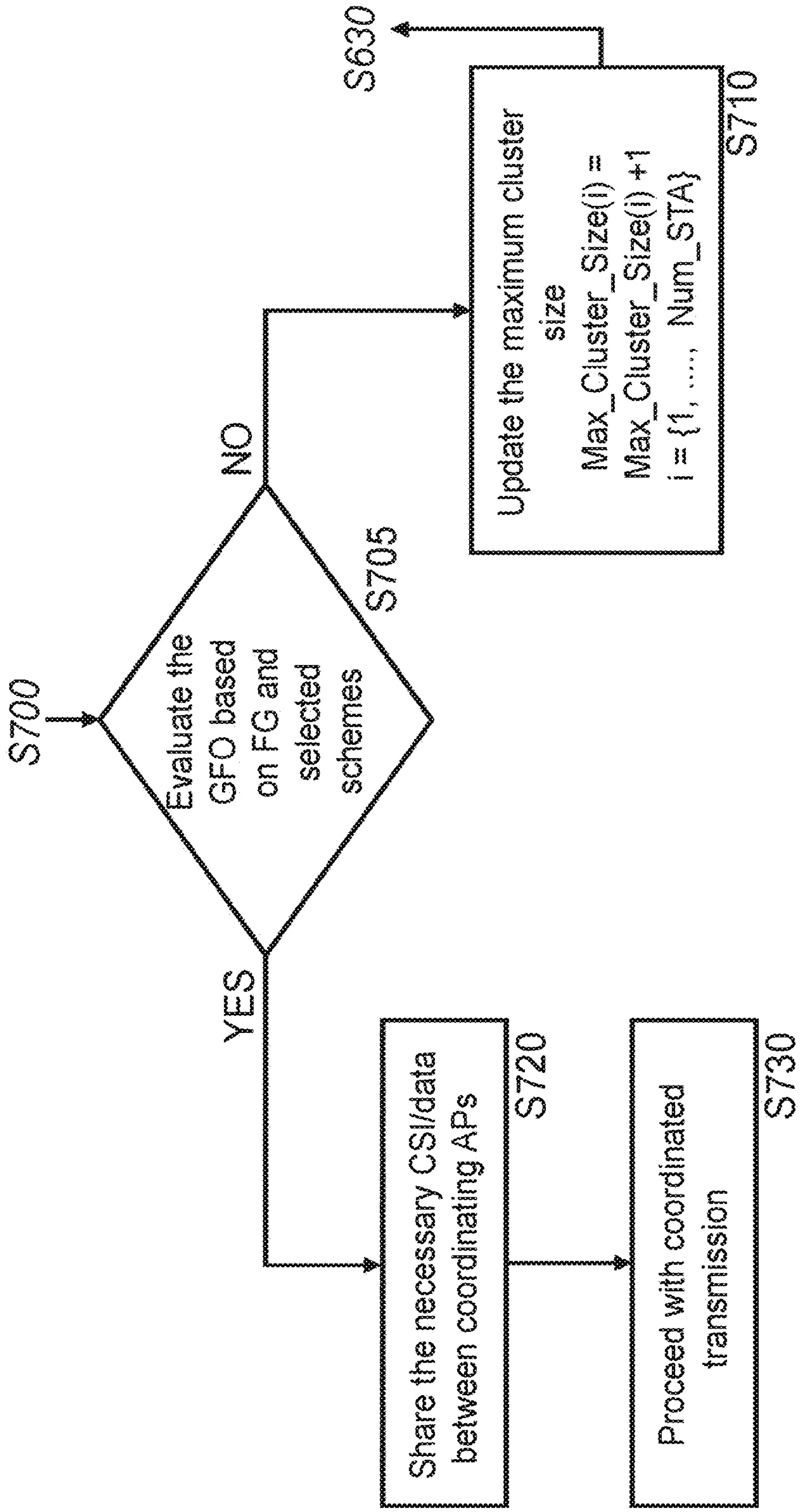

Furthermore, as shown in FIGS. 6B and 6C, a requirement for coordinated communication is shown to comprise both the requirement for multi-link operation tested in step S645 and the requirement for a coordination scheme tested in step S680. However, as an alternative to testing both requirements, only one of these two requirements may be tested. In particular, if the requirement does not comprise the requirement for the coordination scheme(s), steps S660 to S700 may be omitted, and the process proceeds from step S645 to S705 if the determination in step S645 has a positive result.

In such a case, the evaluation of the GFO of step S705 may also be performed in or directly following step S630, e.g., group candidates may be already be selected to meet the GFO if the GFO is not tested for different coordination schemes. Moreover, if the coordination requirement to be tested does not comprise the requirement for multi-link operation, Steps S640 to S655 may be omitted, and the process steps from step S635 to step S660.

Furthermore, also when both of the above-mentioned requirements are tested, for steps S660 and S665 may be performed independently of any steps shown in FIGS. 6A-6C as preceding them.

Implementations in Software and Hardware

The methodologies described herein (at the transmitter side and the received side) may be implemented by various means depending upon the application. For example, these methodologies may be implemented in hardware, operation system, firmware, software, or any combination of two or all of them. For a hardware implementation, any processing circuitry may be used, which may comprise one or more processors. For example, the hardware may comprise one or more of application specific integrated circuits (ASICs), digital signal processors (DSPs), digital signal processing devices (DSPDs), programmable logic devices (PLDs), field programmable gate arrays (FPGAs), processors, controllers, any electronic devices, or other electronic circuitry units or elements designed to perform the functions described above.

If implemented as program code, the functions performed by the transmitting apparatus (device) may be stored as one or more instructions or code on a non-transitory computer readable storage medium such as the memory 210 or any other type of storage. The computer-readable media comprises physical computer storage media, which may be any available medium that can be accessed by the computer, or, in general by the processing circuitry 220. Such computer-readable media may comprise RAM, ROM, EEPROM, optical disk storage, magnetic disk storage, semiconductor storage, or other storage devices. Some particular and non-limiting examples comprise compact disc (CD), CD-ROM, laser disc, optical disc, digital versatile disc (DVD), Blu-ray (BD) disc or the like. Combinations of different storage media are also possible—in other words, distributed and heterogeneous storage may be employed.

The embodiments and exemplary implementations mentioned above show some non-limiting examples. It is understood that various modifications may be made without departing from the disclosed subject matter. For example, modifications may be made to adapt the examples to new systems and scenarios without departing from the central concept described herein.

Summarizing, provided is a controlling coordinated communication by a plurality of access points of a wireless communication system, comprising an interface configured to receive a channel characteristic measured at a terminal device from a plurality of access points, and circuitry configured to determine, for one or more candidate groups of access points out of the plurality of access points for serving the terminal device, whether or not at least one backhaul link feature meets a requirement for coordinated communication, the requirement comprising at least one of a requirement for multi-link operation which the circuitry is configured to test if at least one access point out of the candidate group of access points operates with multiple active links, or a requirement for a coordination scheme out of one or more coordination schemes applicable to the terminal device, select a candidate group out of the one or more candidate groups as a group of access points for serving the terminal device in accordance with the result of the determining, and control, via the interface, the selected group of access points to serve the terminal device in coordinated communication.

In some embodiments, the one or more candidate groups are a plurality of candidate groups, and if the circuitry determines for a first candidate group out of the plurality of candidate groups, that the backhaul link feature does not meet the requirement for coordinated communication, the circuitry is configured to increment a maximum allowed group size of the group of access points and form a second candidate group out of the plurality of candidate groups not larger than the incremented maximum allowed group size.

In some embodiments, the circuitry is configured to select the first candidate group and the second candidate group based on the measured channel characteristic.

In some embodiments, the terminal device is a terminal device out of a plurality of terminal devices and the circuitry is configured to perform determination and selection for each terminal device out of the plurality of terminal devices.

In some embodiments, if the circuitry determines that the at least one backhaul link feature does not meet the requirement for multi-link operation, the circuitry is configured to increment the maximum allowed group size for all of the plurality of terminal devices.

In some embodiments, an initial value of the maximum allowed group size is set for all of the plurality of terminal devices.

In some embodiments, if the circuitry determines that the at least one backhaul link feature does not meet the requirement for the coordination scheme, the circuitry is configured to increment the maximum allowed group size for said terminal device.

In some embodiments, before incrementing the maximum allowed group size for said terminal, the circuitry determines, for each of the one or more coordination schemes applicable to the terminal device, whether or not the at least one backhaul link feature meets the requirement for the respective coordination scheme.

In some embodiments, the circuitry is configured to increment the maximum allowed group size and form a third candidate group out of the plurality of candidate groups if the circuitry determines that the first candidate group does not meet a group formation objective.

In some embodiments, the circuitry is configured to increment the maximum allowed group size and form a third candidate group out of the plurality of candidate groups if the circuitry determines that a combination of the first candidate group and a selected coordination scheme out of the one or more coordination schemes for which the at least one backhaul link feature meets the requirement for coordinated communication does not meet the group formation objective.

In some embodiments, the group formation objective comprises at least one of load balancing, energy efficiency, spectral efficiency, or backhaul optimization.

In some embodiments, the circuitry is configured to select the one or more coordination schemes based on a requirement of at least one of throughput, latency, reliability, or jitter for said terminal device, the measured channel characteristic, and a benefit metric indicating a tradeoff between performance and overhead.

In some embodiments, the at least one backhaul link feature comprises at least one of a backhaul latency, a backhaul bandwidth, or a synchronization among the plurality of access points.

Further provided is an access point for performing coordinated communication, the access point being comprised in the plurality of access points and comprising the control apparatus according to any of the disclosed embodiments.

Further provided is a control method, for controlling coordinated communication by a plurality of access points, wherein the control method is to be performed by a control apparatus and comprises receiving a channel characteristic measured at a terminal device from a plurality of access points, determining, for one or more candidate groups of access points out of the plurality of access points for serving the terminal device, whether or not at least one backhaul link feature meets a requirement for coordinated communication, the requirement comprising at least one of a requirement for multi-link operation which is tested if at least one access point out of the candidate group of access points operates with multiple active links, or a requirement for a coordination scheme out of one or more coordination schemes applicable to the terminal device, selecting a candidate group out of the one or more candidate groups as a group of access points for serving the terminal device in accordance with the result of the determining, and controlling the selected group of access points to serve the terminal the terminal device in the coordinated communication.

In some embodiments, the one or more candidate groups are a plurality of candidate groups, and the method comprises, if it is determined for a first candidate group out of the plurality of candidate groups, that the backhaul link feature does not meet the requirement for coordinated communication, incrementing a maximum allowed group size of the group of access points and form a second candidate group out of the plurality of candidate groups not larger than the incremented maximum allowed group size.

In some embodiments, the method comprises the first candidate group and the second candidate group based on the measured channel characteristic.

In some embodiments, the terminal device is a terminal device out of a plurality of terminal devices, and the determination and the selection are performed for each terminal device out of the plurality of terminal devices.

In some embodiments, if it is determined that the at least one backhaul link feature does not meet the requirement for multi-link operation, the method comprises incrementing the maximum allowed group size for all of the plurality of terminal devices.

In some embodiments, an initial value of the maximum allowed group size is set for all of the plurality of terminal devices.

In some embodiments, if it is determined that the at least one backhaul link feature does not meet the requirement for the coordination scheme, the maximum allowed group size is incremented for said terminal device.

In some embodiments, before incrementing the maximum allowed group size for said terminal, the method comprises determining, for each of the one or more coordination schemes applicable to the terminal device, whether or not the at least one backhaul link feature meets the requirement for the respective coordination scheme.

In some embodiments, the method comprises incrementing the maximum allowed group size and form a third candidate group out of the plurality of candidate groups if it is determined that the first candidate group does not meet a group formation objective.

In some embodiments, the method comprises incrementing the maximum allowed group size and form a third candidate group out of the plurality of candidate groups if it is determined that a combination of the first candidate group and a selected coordination scheme out of the one or more coordination schemes for which the at least one backhaul link feature meets the requirement for coordinated communication does not meet the group formation objective.

In some embodiments, the group formation objective comprises at least one of load balancing, energy efficiency, spectral efficiency, or backhaul optimization.

In some embodiments, the one or more coordination schemes are selected based on a requirement of at least one of throughput, latency, reliability, or jitter for said terminal device, the measured channel characteristic, and a benefit metric indicating a tradeoff between performance and overhead.

In some embodiments, the at least one backhaul link feature comprises at least one of a backhaul latency, a backhaul bandwidth, or a synchronization among the plurality of access points.

Also provided is a computer program carrying instructions which, when executed by processing circuitry of a control apparatus for controlling coordinated communication by a plurality of access points of a wireless communication system, control the control apparatus to perform the steps according to the control method according to any of its embodiments.

In summary, provided is a control apparatus and a control method for a wireless communication system. The control apparatus is configured to determine for candidate group(s) of access points whether backhaul link feature(s) meet a requirement for coordinated communication with a terminal device. The requirement for coordinated communication comprises a requirement for multi-link operation and/or a requirement for a coordination scheme. Based on a result of this determination, a candidate group of access points is selected as a group of APs for serving the terminal device in coordinated communication. By disclosing these techniques, the present disclosure provides for considering multi-link operation and/or coordination scheme selection in coordinated communication.

The invention claimed is:

1. A control apparatus for controlling coordinated communication by a plurality of access points of a wireless communication system, comprising:

an interface configured to receive a channel characteristic measured at each of a plurality of terminal devices from a plurality of access points; and circuitry configured to:

determine, for each terminal device of the plurality of terminal devices and for one or more candidate groups of access points out of the plurality of access points for serving the terminal device, whether or not at least one backhaul link feature meets a requirement for coordinated communication, the requirement comprising at least one of:

a requirement for multi-link operation which the circuitry is configured to test if at least one access point out of the candidate group of access points operates with multiple active links, or a requirement for a coordination scheme out of one or more coordination schemes applicable to the terminal device;

select a candidate group out of the one or more candidate groups as a group of access points for serving the terminal device based on the determining; and control, via the interface, the selected group of access points to serve the terminal device in coordinated communication, wherein, if the circuitry determines, for a first candidate group of the one or more candidate groups, that the backhaul link feature does not meet the requirement for the coordination scheme, the circuitry is configured to increment a maximum allowed group size of the group of access points for the terminal device and form a second candidate group out of the plurality of candidate groups not larger than the incremented maximum allowed group size, and wherein, if the circuitry determines, for all of the plurality of terminal devices and for the first candidate group, that the at least one backhaul link feature meets the requirement for coordinated communication, the circuitry is configured to:

determine whether a plurality of candidate groups comprising, for each of the plurality of terminal devices, the first candidate group, meets a group formation objective, and increment the maximum allowed group size for all of the plurality of terminal devices and form a third candidate group out of the plurality of candidate groups for each of the plurality of terminal devices if the circuitry determines that the plurality of candidate groups does not meet the group formation objective.

2. The control apparatus according to claim 1, wherein the circuitry is configured to select the first candidate group and the second candidate group based on the measured channel characteristic.

3. The control apparatus according to claim 1, wherein, if the circuitry determines that the at least one backhaul link feature does not meet the requirement for multi-link operation, the circuitry is configured to increment the maximum allowed group size for all of the plurality of terminal devices.

4. The control apparatus according to claim 3, wherein an initial value of the maximum allowed group size is set for all of the plurality of terminal devices.

5. The control apparatus according to claim 1, wherein, before incrementing the maximum allowed group size for the terminal device, the circuitry determines, for each of the one or more coordination schemes applicable to the terminal device, whether or not the at least one backhaul link feature meets the requirement for the respective coordination scheme.

6. The control apparatus according to claim 1, wherein the circuitry is configured to increment the maximum allowed group size and form the third candidate group out of the plurality of candidate groups if the circuitry determines that a combination of the first candidate group and a selected coordination scheme out of the one or more coordination schemes for which the at least one backhaul link feature meets the requirement for coordinated communication does not meet the group formation objective.

7. The control apparatus according to claim 1, wherein the group formation objective comprises at least one of load balancing, energy efficiency, spectral efficiency, or backhaul optimization.

8. The control apparatus according to claim 1, wherein the circuitry is configured to select the one or more coordination schemes based on a requirement of at least one of throughput, latency, reliability, or jitter for the terminal device, the measured channel characteristic, and a benefit metric indicating a tradeoff between performance and overhead.

9. The control apparatus according to claim 1, wherein the at least one backhaul link feature comprises at least one of a backhaul latency, a backhaul bandwidth, or a synchronization among the plurality of access points.

10. The control apparatus according to claim 1, wherein, in the multi-link operation, the at least one access point operates on the multiple active links simultaneously.

11. The control apparatus according to claim 10, wherein the multiple links use the same bands or channels.

12. An access point for performing coordinated communication, the access point being comprised in the plurality of access points and comprising the control apparatus according to claim 1.

13. A control method for controlling coordinated communication by a plurality of access points, wherein the control method is to be performed by a control apparatus and comprises:

receiving a channel characteristic measured at each of a plurality of terminal devices from a plurality of access points;

determining, for each terminal device of the plurality of terminal devices and for one or more candidate groups of access points out of the plurality of access points for serving the terminal device, whether or not at least one backhaul link feature meets a requirement for coordinated communication, the requirement comprising at least one of:

a requirement for multi-link operation which is tested if at least one access point out of the candidate group of access points operates with multiple active links, or a requirement for a coordination scheme out of one or more coordination schemes applicable to the terminal device;

selecting a candidate group out of the one or more candidate groups as a group of access points for serving the terminal device based on the determining; and controlling the selected group of access points to serve the terminal the terminal device in the coordinated communication, in response to determining, for a first candidate group of the one or more candidate groups, that the backhaul link feature does not meet the requirement for the coordination scheme, incrementing a maximum allowed group size of the group of access points for the terminal device and forming a second candidate group out of the plurality of candidate groups not larger than the incremented maximum allowed group size, and in response to determining, for all of the plurality of terminal devices and for the first candidate group, that the at least one backhaul link feature meets the requirement for coordinated communication:

determining whether a plurality of candidate groups comprising, for each of the plurality of terminal devices, the first candidate group, meets a group formation objective, and incrementing the maximum allowed group size for all of the plurality of terminal devices and forming a third candidate group out of the plurality of candidate groups for each of the plurality of terminal devices if it is determined that the plurality of candidate groups does not meet the group formation objective.

* * * * *